US008769683B1

(12) United States Patent
Oliver (10) Patent No.: US 8,769,683 B1
(45) Date of Patent: Jul. 1, 2014

(54) APPARATUS AND METHODS FOR REMOTE CLASSIFICATION OF UNKNOWN MALWARE

(75) Inventor: Jonathan James Oliver, Kew (AU)

(73) Assignee: Trend Micro Incorporated, Tokyo (JP)

( * ) Notice: Subject to any disclaimer, the term of this patent is extended or adjusted under 35 U.S.C. 154(b) by 947 days.

(21) Appl. No.: 12/498,901

(22) Filed: Jul. 7, 2009

(51) Int. Cl.
*G06F 21/00* (2013.01)
*G06F 21/56* (2013.01)
*H04L 29/06* (2006.01)
*G06F 21/64* (2013.01)

(52) U.S. Cl.
CPC ............ *G06F 21/561* (2013.01); *G06F 21/564* (2013.01); *H04L 63/145* (2013.01); *G06F 21/56* (2013.01); *G06F 21/64* (2013.01)
USPC ................................ 726/23; 726/24; 719/311

(58) Field of Classification Search
USPC .......................................................... 726/23
See application file for complete search history.

(56) References Cited

U.S. PATENT DOCUMENTS

| 7,406,454 | B1 | 7/2008 | Liu et al. | |
|---|---|---|---|---|
| 7,891,012 | B1* | 2/2011 | Kiel et al. | 726/30 |
| 2003/0225841 | A1 | 12/2003 | Song et al. | |
| 2005/0015626 | A1 | 1/2005 | Chasin | |
| 2005/0132206 | A1* | 6/2005 | Palliyil et al. | 713/188 |
| 2005/0188214 | A1* | 8/2005 | Worley et al. | 713/187 |
| 2005/0203901 | A1* | 9/2005 | Waldvogel et al. | 707/5 |
| 2006/0075048 | A1 | 4/2006 | Gruper et al. | |
| 2006/0095966 | A1 | 5/2006 | Park | |
| 2006/0101334 | A1 | 5/2006 | Liao et al. | |
| 2006/0191020 | A1* | 8/2006 | Miller | 726/28 |
| 2007/0033645 | A1 | 2/2007 | Jones | |
| 2007/0038709 | A1 | 2/2007 | Medvedev et al. | |
| 2008/0159632 | A1* | 7/2008 | Oliver et al. | 382/209 |
| 2008/0201722 | A1* | 8/2008 | Sarathy | 719/311 |
| 2009/0222474 | A1* | 9/2009 | Alpern et al. | 707/102 |
| 2009/0300761 | A1* | 12/2009 | Park et al. | 726/23 |
| 2009/0320133 | A1* | 12/2009 | Viljoen et al. | 726/24 |

OTHER PUBLICATIONS

Nilsimsa "What's a nilsimsa code?", 2 sheets [retrieved on Mar. 10, 2009], retrieved from the internet: http://ixazon.dynip.com/~cmeclax/nilsimsa.html.
Bloom filter—Wikipedia, the free encyclopedia, 10 sheets [retrieved on Mar. 10, 2009], retrieved from the internet: http://en.wikipedia.org/wiki/Bloom_filter.
Cluster analysis—Wikipedia, the free encyclopedia, 13 sheets [retrieved on Mar. 10, 2009], retrieved from the internet: http://en.wikipedia.org/wiki/Data_clustering.

(Continued)

*Primary Examiner* — Andrew Goldberg
(74) *Attorney, Agent, or Firm* — Okamoto & Benedicto LLP (57) ABSTRACT

One embodiment relates to an apparatus for remote classification of malware. Computer-readable code is configured to be executed by the processor so as to receive a locality-sensitive hash (LSH) value associated with a file from a host computer via the network interface, determine whether the LSH value associated with the file is similar to a LSH value in an entry in an LSH data structure, and indicate that the file is a variant of known malware associated with the entry if the LSH value associated with the file is similar to the LSH value in the entry. Another embodiment relates to a method for remote classification of malware. Another embodiment relates to an apparatus configured to determine whether a file includes malware. Another embodiment relates to a method for detecting malware within an institutional network. Other embodiments, aspects and features are also disclosed.

17 Claims, 11 Drawing Sheets

(56) References Cited

OTHER PUBLICATIONS

Cyclic redundancy check—Wikipedia, the free encyclopedia, 5 sheets [retrieved on Mar. 10, 2009], retrieved from the internet: http://en.wikipedia.org/wiki/Cyclic_redundancy_check.

SHA hash functions—Wikipedia, the free encyclopedia, 12 sheets [retrieved on Mar. 10, 2009], retrieved from the internet: http://en.wikipedia.org/wiki/SHA1.

MD5—Wikipedia, the free encyclopedia, 7 sheets [retrieved on Mar. 10, 2009], retrieved from the internet: http://en.wikipedia.org/wiki/MD5.

Zero-day virus—Wikipedia, the free encyclopedia, 2 sheets [retrieved on Mar. 10, 2009], retrieved from the internet: http://en.wikipedia.org/wiki/Zero-day_virus.

Sunbelt Blog: The growth of malware, Jan. 24, 2008, 2 sheets, webpage [online], retrieved from the internet: http://sunbeltblog.blogspot.com/2008/01/growth-of-malware.html.

Sebastien Josse "Secure and adavance unpacking using computer emulation", published May 4, 2007, pp. 221-236, Springer-Verlag France 2007.

Lutz Bohne "Pandora's Bochs: Automatic Unpacking of Malware", Diploma Thesis, Jan. 28, 2008, 118 sheets, RWTH Aachen University, Germany.

Mehran Sahami "Using Machine Learning to Improve Information Access", a Dissertation, Dec. 1998, 240 sheets, Stanford University, California.

\* cited by examiner

APPARATUS AND METHODS FOR REMOTE CLASSIFICATION OF UNKNOWN MALWARE

BACKGROUND

1. Field of the Invention

The present invention relates generally to communication networks, and more particularly, but not exclusively to the detection and classification of new malware variants and/or families.

2. Description of the Background Art

The amount of malware is constantly increasing due to the creation of new types of malware and variants of existing malware. The number of unique malware has been growing exponentially in recent years.

Conventional anti-virus scanning is typically reactionary. It is reactionary in that the anti-virus software is updated to protect a computer from malware after a signature which identifies the malware is known. If the malware being examined is a new or unknown variant, then conventional anti-virus scanning is unlikely to identify the malware. Unfortunately, this means there is often a substantial delay between the release of a new malware variant and when the protection is effectively implemented.

Another technique for identifying malware involves analyzing the behavior of programs in a protected environment and identifying suspicious activity (such as disabling the malware scanner). However, this behavioral approach to malware identification may be problematic in its accuracy. For example, some malicious activity is difficult to distinguish from the activity of legitimate programs. As a result, some malware may not be identified as doing malicious activity. Other malware may not be detected because they wait for a triggering event before attempting to perform malicious activity.

Another technique for identifying malware involves identifying substrings and patterns within malware code which are common to malware and malware groups. However, this approach often fails to detect new malware variants. This approach also often fails to detect targeted malware outbreaks which occur on only a limited number of hosts (possibly within a single organizational network).

It is highly desirable to improve protection against malware. In particular, it is highly desirable to improve techniques to detect and classify new malware variants and families.

SUMMARY

One embodiment relates to an apparatus for remote classification of malware. The apparatus includes a data storage system configured to store computer-readable code and data, a network interface communicatively connected to a network and configured to receive and send data via the network, and a processor configured to access the data storage system and to execute said computer-readable code. Computer-readable code is configured to be executed by the processor so as to receive a locality-sensitive hash (LSH) value associated with a file from a host computer via the network interface, determine whether the LSH value associated with the file is similar to a LSH value in an entry in an LSH data structure, and indicate that the file is a variant of known malware associated with the entry if the LSH value associated with the file is similar to the LSH value in the entry.

Another embodiment relates to a method performed by executing computer-readable code on an apparatus which includes a data storage system configured to store the computer-readable code and data, a network interface communicatively connected to a network and configured to receive and send data via the network, and a processor configured to access the data storage system and to execute said computer-readable code. Said apparatus receives a locality-sensitive hash (LSH) value associated with a file from a host computer via the network interface, determines whether the LSH value associated with the file is similar to an LSH value in an entry in an LSH data structure, and indicates that the file is a variant of known malware associated with the entry if the LSH value associated with the file is similar to the LSH value in the entry.

Another embodiment relates to an apparatus configured to determine whether a file includes malware. The apparatus includes a data storage system configured to store computer-readable code and data, a network interface communicatively connected to a network and configured to receive and send data via the network, and a processor configured to access the data storage system and to execute said computer-readable code. Computer-readable code is configured to be executed by the processor so as to select a file to be checked for presence of malware, calculate a locality-sensitive hash (LSH) value associated with the file, send the LSH value associated with the file to a remote malware classifier, and receive a result from the remote malware classifier which indicates whether the file includes malware.

These and other features of the present invention will be readily apparent to persons of ordinary skill in the art upon reading the entirety of this disclosure, which includes the accompanying drawings and claims.

DETAILED DESCRIPTION

Applicants have determined that prior technologies to detect and classify unknown malware have certain disadvantages and inefficiencies. The present application discloses apparatus and methods for remote detection and classification of new malware variants and/or families. Advantageously, these apparatus and methods require neither submission of samples of the suspected malware nor analysis of program behavior.

Figure 1:
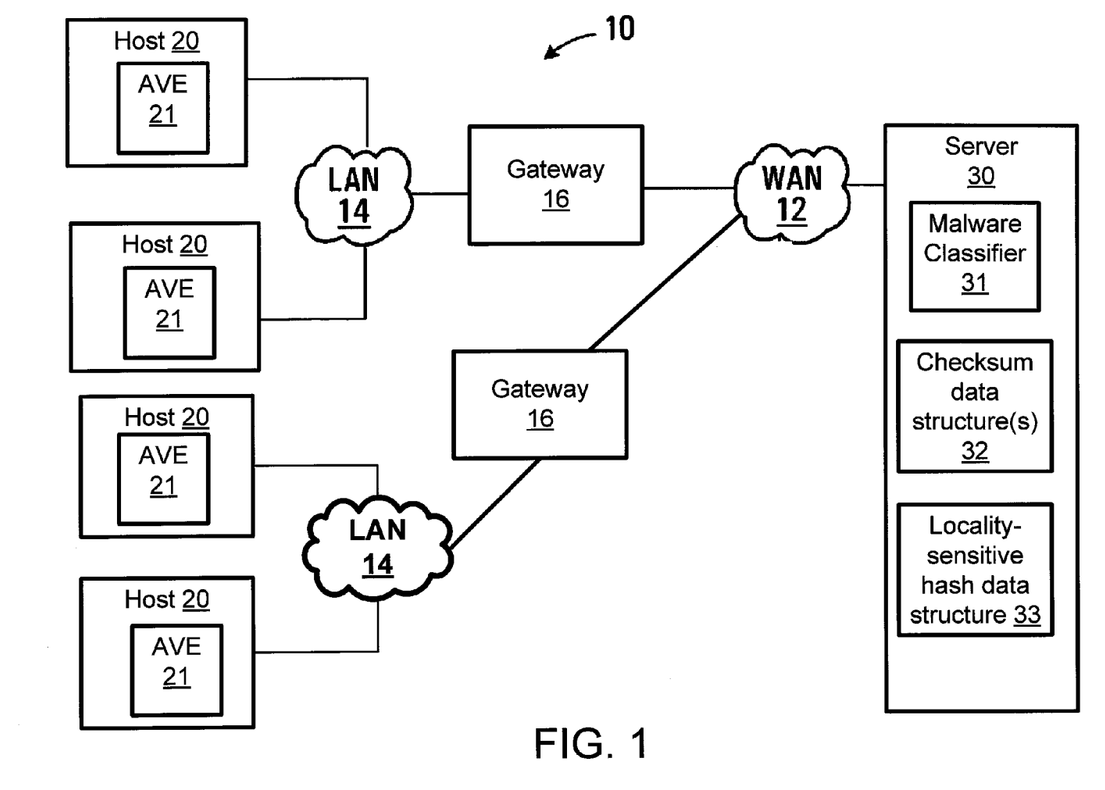
FIG. 1 is a schematic diagram depicting a data communication system which is configured to implement a first embodiment of the invention.

Referring to FIG. 1, a data communication system 10 according to a first embodiment of the invention is shown. The system includes a Wide Area Network (WAN) 12, such as an intranet or Internet, multiple Local Area Networks (LANs) (wired or wireless) 14, and gateways 16 connecting the LANs to the WAN. Two LANs are shown interconnected via the WAN, but the WAN may interconnect any number of LANs.

A plurality of personal computers (PCs) or other computer hosts 20 may be connected to each LAN 14. In accordance with an embodiment of the invention, one or more of the hosts 20 may be configured with an anti-virus engine (AVE) 21.

A server 30 may be connected to the WAN 12. In accordance with an embodiment of the invention, the server 30 may be configured with a central malware classifier 31. The server 30 may also be configured with one or more checksum datta structure(s) 32 and a data structure of locality-sensitive hashes 33.

Figure 2:
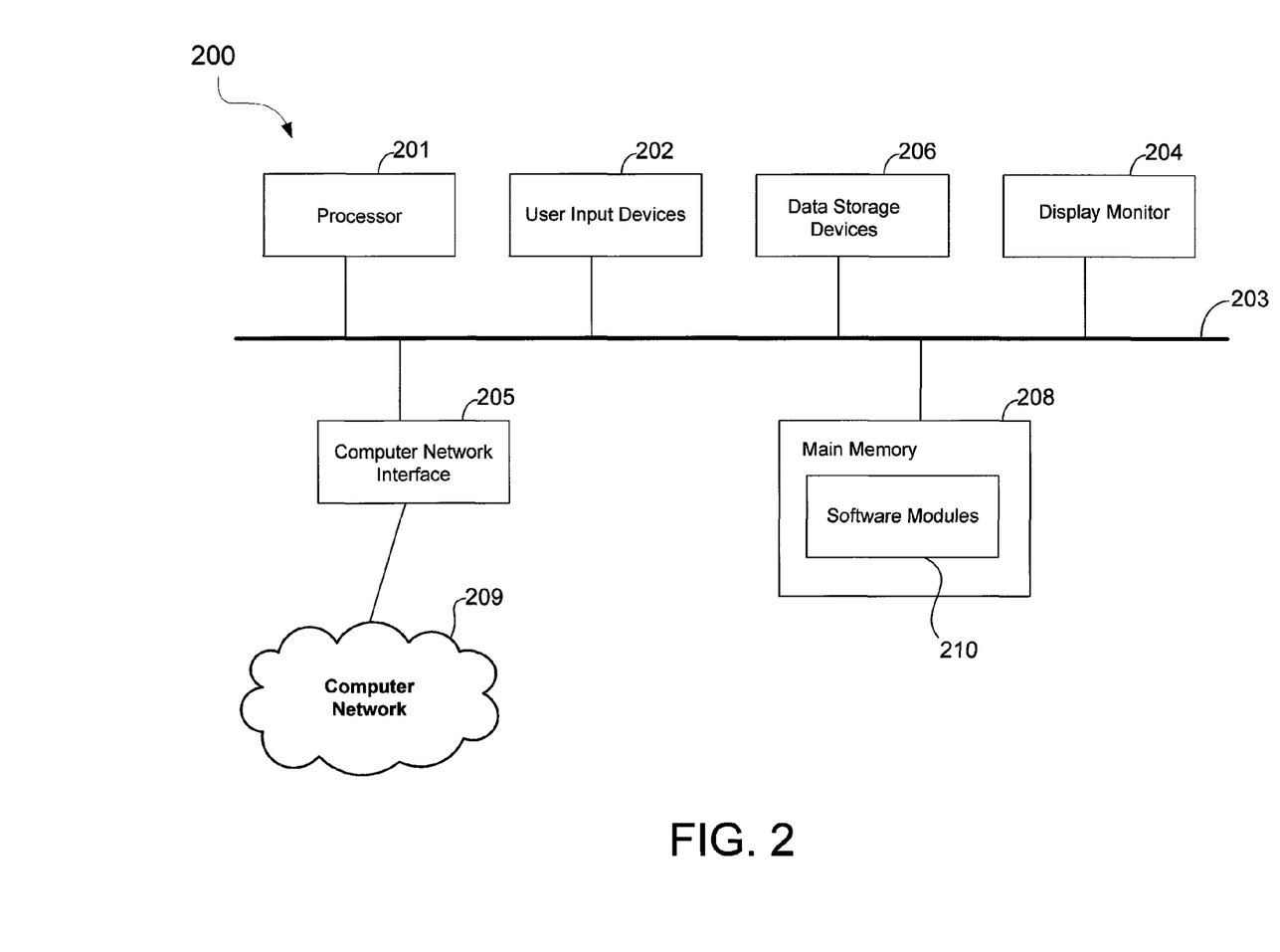
FIG. 2 is a schematic diagram depicting an example computer apparatus which may be configured as components in a data communication system in accordance with an embodiment of the invention.

Referring now to FIG. 2, there is shown a schematic diagram of an example computer apparatus 200 which may be configured as components in a data communication system in accordance with an embodiment of the invention. The computer apparatus 200 may be employed as a host computer 20, a gateway 16, or a server 30, for example. The computer 200 may have less or more components to meet the needs of a particular application. The computer 200 may include a processor 201, such as those from the Intel Corporation of Santa Clara, Calif., or Advanced Micro Devices of Sunnyvale, Calif., for example. The computer 200 may have one or more buses 203 coupling its various components. The computer 200 may include one or more user input devices 202 (e.g., keyboard, mouse), one or more data storage devices 206 (e.g., hard drive, optical disk, USB memory), a display monitor 204 (e.g., LCD, flat panel monitor, CRT), a computer network interface 205 (e.g., network adapter, modem), and a main memory 208 (e.g., RAM). The data storage system of the computer apparatus includes the data storage devices 206 and the main memory 208. The computer network interface 205 may be coupled to one or more data communication networks 209, which in this example may be a LAN 14 and/or a WAN 12.

In the example of FIG. 2, the main memory 208 includes software modules 210. The software modules 210 may comprise computer-readable program code (i.e., software) components of a host computer 20, a gateway 16, or a server 30, for example.

The software modules 210 may be loaded from the data storage device 206 to the main memory 208 for execution by the processor 201. In accordance with an embodiment of the invention, the software modules 210 on a host computer 20 may include an anti-virus engine (AVE) 21, and the software modules 210 on a server 30 may include a malware classifier 31. In addition, the data storage device 206 on the server 30 may include one or more checksum data structure(s) 32 and a locality-sensitive hash data structure 33.

Figure 3:
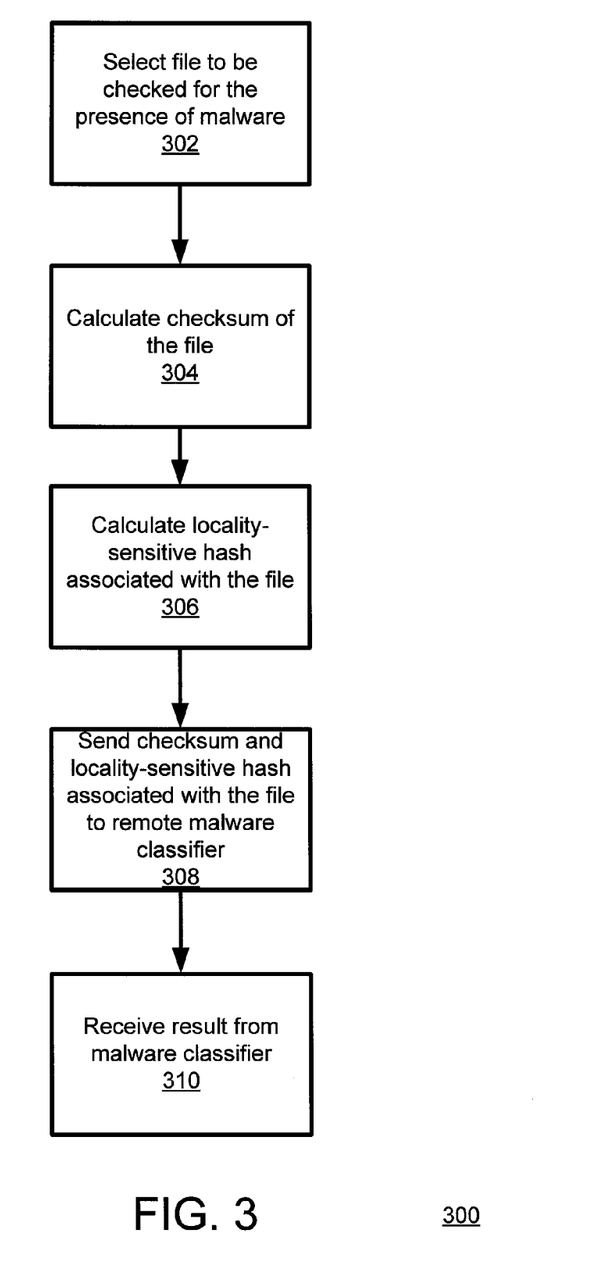
FIG. 3 is a flow chart depicting a method performed by an anti-virus engine at a host computer in accordance with the first embodiment of the invention.

FIG. 3 is a flow chart depicting a method 300 performed by an anti-virus engine 21 at a host computer 20 in accordance with the first embodiment of the invention. For example, the host computer 20 may be a personal computer (desktop or laptop) connected via a LAN 14 to the Internet. As another example, the host computer may be a cellular phone configured to communicate over a telecommunication network to the Internet.

As seen in FIG. 3, the anti-virus engine 21 may be configured to select 302 a file to be checked for the presence of malware. The file selected may be, for example, a file stored in a data storage system or a file attached to a message.

The anti-virus engine 21 may be further configured to calculate 304 a checksum of the file on disk or in transmission. The checksum may be, for example, a cyclic redundancy check (CRC), or a SHA1 hash, or an MD5 hash. This checksum calculation 304 is optional in that it may not be performed in some embodiments of the present invention.

The anti-virus engine 21 may be also configured to calculate 306 a locality-sensitive hash (LSH) associated with the file. In one embodiment, the locality-sensitive hash comprises a Nilsimsa code. Nilsimsa codes are locality sensitive in that a relatively small change in the message results in a relatively small change in the corresponding Nilsimsa code. In one implementation, the Nilsimsa codes have a fixed length of 256 bits.

The anti-virus engine 21 may be configured to calculate 306 the locality-sensitive hash (LSH) associated with the file either on the file itself or a memory image the file at a predetermined event when the unpacking of the executable has completed. There are a number of heuristics known for determining when the unpacking process has completed meaning that the locality-sensitive hash of the memory image of the file may be calculated 306, for example: (i) after a predetermined number of instructions (for instance, after 1,000,000 instructions); (ii) after a predetermined time period (for instance, after one second); or (iii) at the point when the program attempts to access a disk and/or a network. Applicant expects that each variant of a malware family will have a slightly different memory image at the predetermined event. The term "memory image" as used herein refers to the term as it is used in the relevant technical field, for example, in "Pandora's Bochs: Automatic Unpacking of Malware," by Lutz Bohne, Diploma Thesis, Department of Computer Science, RWTH Aachen University, Germany, Jan. 28, 2008.

Malware frequently has a portion of itself packed and/or encrypted. A technique for detecting malicious code in such files involves dynamic execution of a malware sample in a monitored environment so as to heuristically detect malicious behavior. In accordance with an embodiment of the invention, calculating the LSH at a specific or predetermined event sufficiently far along in the execution allows the malware to unpack and/or decrypt before calculation of the LSH is performed.

The checksum of the file (if performed) and locality-sensitive hash of the file or the memory image of the file may then be sent 308 as a pair of data by the anti-virus engine 21 via a network to a malware classifier 31. As shown in FIG. 1, the malware classifier 30 may be configured at a server 30 which may be reached by way of a wide area network 12 (such as the Internet, for example).

Subsequently, after the malware classifier 31 processes the data, a scan result may be returned by the malware classifier 31 and then received 310 by the anti-virus engine 21 which sent the checksum of the file (if performed) and the locality-sensitive hash memory imageassociated with the file. The result may be determined, for example, in accordance with the method 400 shown in FIG. 4 or, alternately, with the method 500 shown in FIG. 5.

Figure 4:
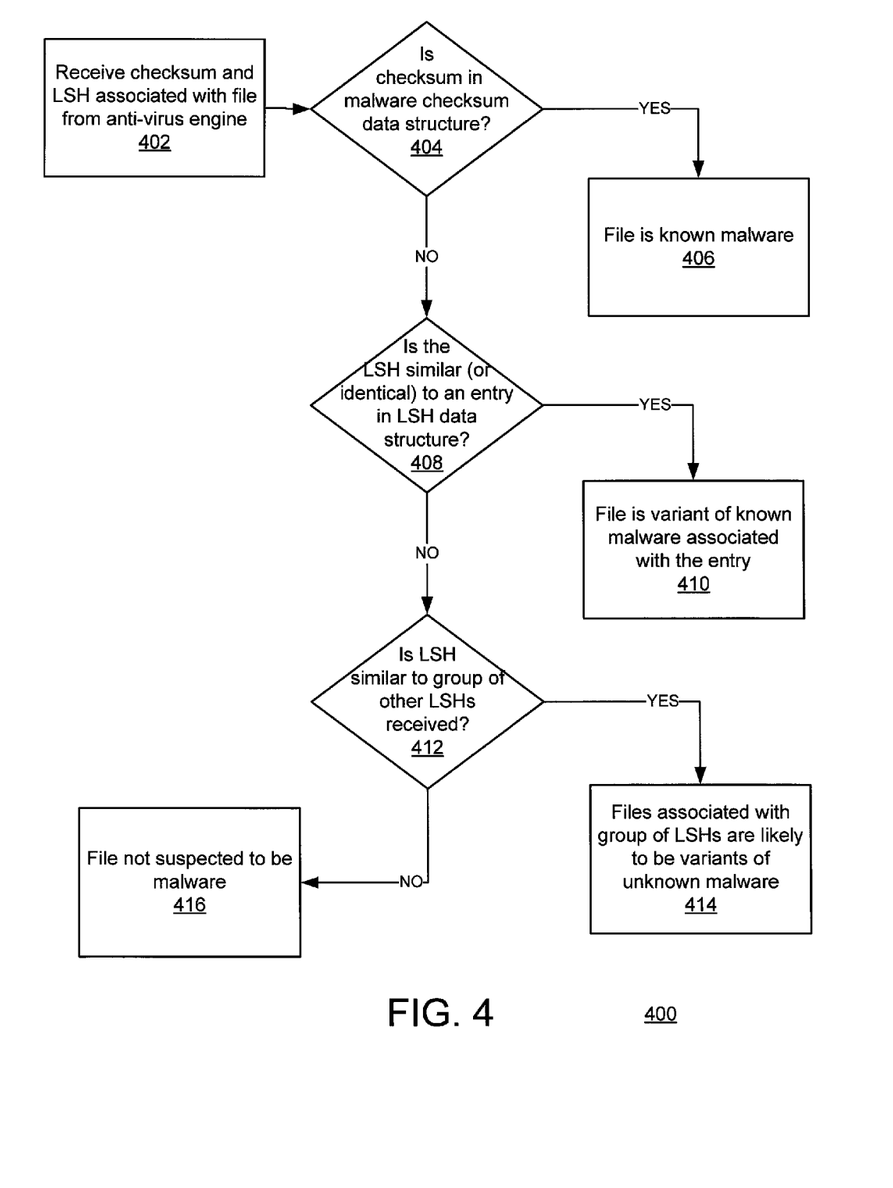
FIG. 4 is a flow chart depicting a method performed by a malware classifier at a server in accordance with the first embodiment of the invention.

FIG. 4 is a flow chart depicting a method 400 performed by a malware classifier 31 in accordance with the first embodiment of the invention. For example, the malware classifier 31 may be at a server 30 which is connected to the Internet. As seen in FIG. 4, a checksum of a file (if the checksum is provided) and a locality-sensitive hash (LSH) associated with the file is received 402 by the malware classifier 31 from an anti-virus engine 21.

If the checksum is provided, the malware classifier 31 may then make a determination 404 as to whether the checksum of the file is in a malware checksum data structure (see checksum data structure(s) 32). The malware checksum data structure is a searchable data structure that includes checksums of known malware files (i.e. files which were previously determined to be malware). If the checksum of the file is found in the malware checksum data structure, then the malware classifier 31 may indicate 406 that the file is known malware. Such an indication may be returned to the AVE 21 which sent the checksum/LSH pair.

On the other hand, if the checksum of the file is not found in the malware checksum data structure (or if the checksum is not provided), then the malware classifier 31 may make a further determination 408 as to whether the LSH memory imageassociated with the file is similar (or identical) to an entry in the LSH data structure 33. The LSH data structure 33 is a searchable data structure that includes LSH values associated with known malware files (i.e. files which were previously determined to be malware). If the LSH associated with the file is found in the LSH data structure 33, then the malware classifier 31 may determine 410 that the file is a variant of known malware which is associated with the similar LSH entry. In this case, the file is highly likely to be a suspicious variant of known malware because the LSH is similar while the checksum (if provided) is different. The malware classifier 31 may then return a result indicating this determination to the AVE 21 which sent the checksum (if provided) and LSH data.

If the LSH associated with the file is not found in the LSH data structure, then the malware classifier 31 may make a further determination 412 as to whether the LSH associated with the file is similar to a group of other LSH values received. The group of other LSH values would be a group of previously submitted LSH values which are similar to each other. For example, if the LSH values are 256-bit Nilsimsa codes, then a LSH values may be sufficiently similar to be considered as part of a group if the LSH values have more than N out of the 256 bits in common, where N is a settable threshold number of bits. If the LSH associated with the file is sufficiently similar to a group of other LSH values received, then the malware classifier 31 may determine 414 that the files associated with the group of LSH values are variants of an unknown or new malware. In this case, the file is highly likely to be a suspicious variant of new or unknown malware because the LSH associated with the file is similar to the group while the checksum (if provided) is different. The malware classifier 31 may then return a result indicating this determination to the AVE 21 which sent the checksum (if provided) and LSH data.

Finally, if the LSH associated with the file is not similar to any group of other LSH values received, then the malware classifier 31 may indicate 416 that the file associated with the checksum (if provided) and LSH data is not suspected to be malware. Such an indication may be returned to the AVE 21 which sent the checksum (if provided) and LSH data.

Figure 5:
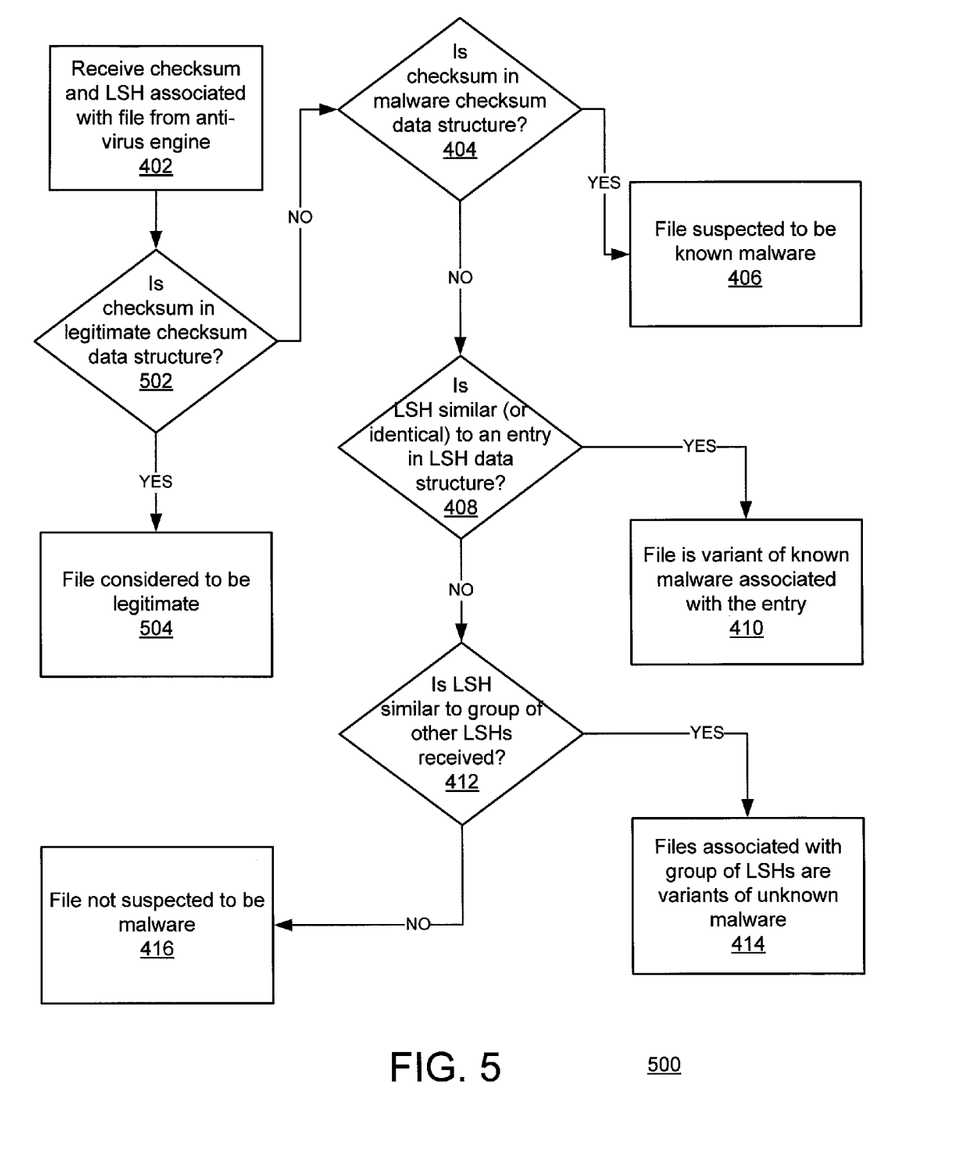
FIG. 5 is a flow chart depicting an alternate method performed by a malware classifier at a server in accordance with the first embodiment of the invention.

FIG. 5 is a flow chart depicting an alternate method 500 performed by a malware classifier 31 in accordance with the first embodiment of the invention. The method 500 of FIG. 5 is similar to the method 400 of FIG. 4. The difference is that two new blocks 502 and 504 are inserted in FIG. 5 between blocks 402 and 404. (In alternate embodiments, blocks 502 and 504 may be inserted elsewhere in FIG. 5, such as between blocks 404 and 408, for example.)

As seen in FIG. 5, after the checksum/LSH pair for a file is received 402, the malware classifier 31 may make a determination 502 as to whether the checksum is in a legitimate checksum data structure. The legitimate checksum data structure is a searchable data structure that includes checksums of known legitimate (non-malware) files. If the checksum is found in the legitimate checksum data structure, then the malware classifier 31 may indicate 504 that the file is legitimate (non-malware). Such an indication may be returned to the AVE 21 which sent the checksum/LSH pair.

On the other hand, if the checksum of the file is not in a legitimate checksum data structure, then the malware classifier 31 may go on to make the further determination per block 404 and continue the further steps per blocks 406, 408, 410, 412, 414, and 416, as discussed above in relation to FIG. 4.

Figure 6:
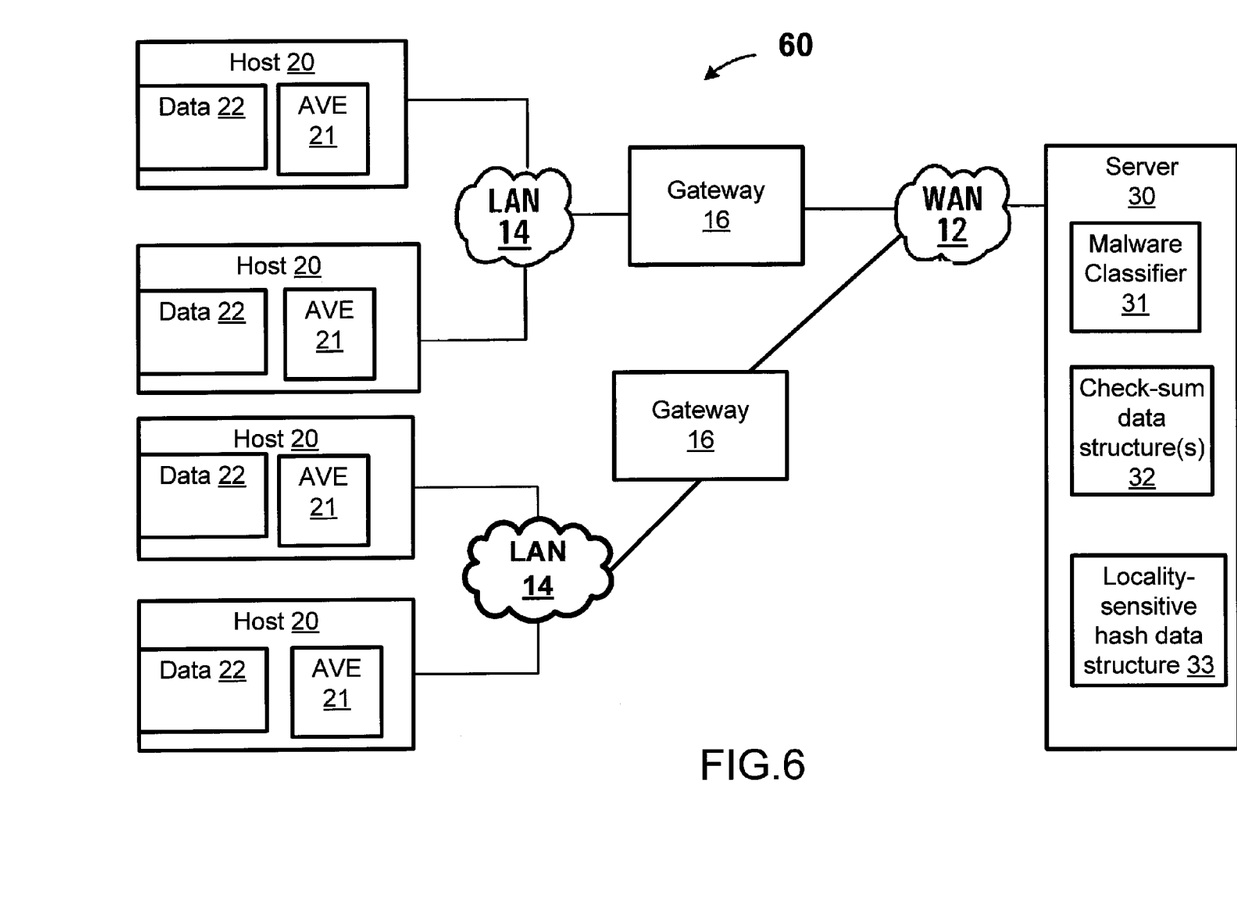
FIG. 6 is a schematic diagram depicting a data communication system which is configured to implement a second embodiment of the invention.

FIG. 6 is a schematic diagram depicting a data communication system which is configured to implement a second embodiment of the invention. The system 60 of FIG. 6 is similar to the system 10 of FIG. 1. However, in the system 60 of FIG. 6, one or more data structure(s) 22 is (are) stored locally at the host 20 so as to be searchable by the anti-virus engine 21.

For the method 700 discussed below in relation to FIG. 7, the data structure(s) 22 would include a legitimate checksum data structure and a malware checksum data structure. For the method 900 discussed below in relation to FIG. 9, the data structure(s) 22 would also include a locality-sensitive hash data structure.

Figure 7:
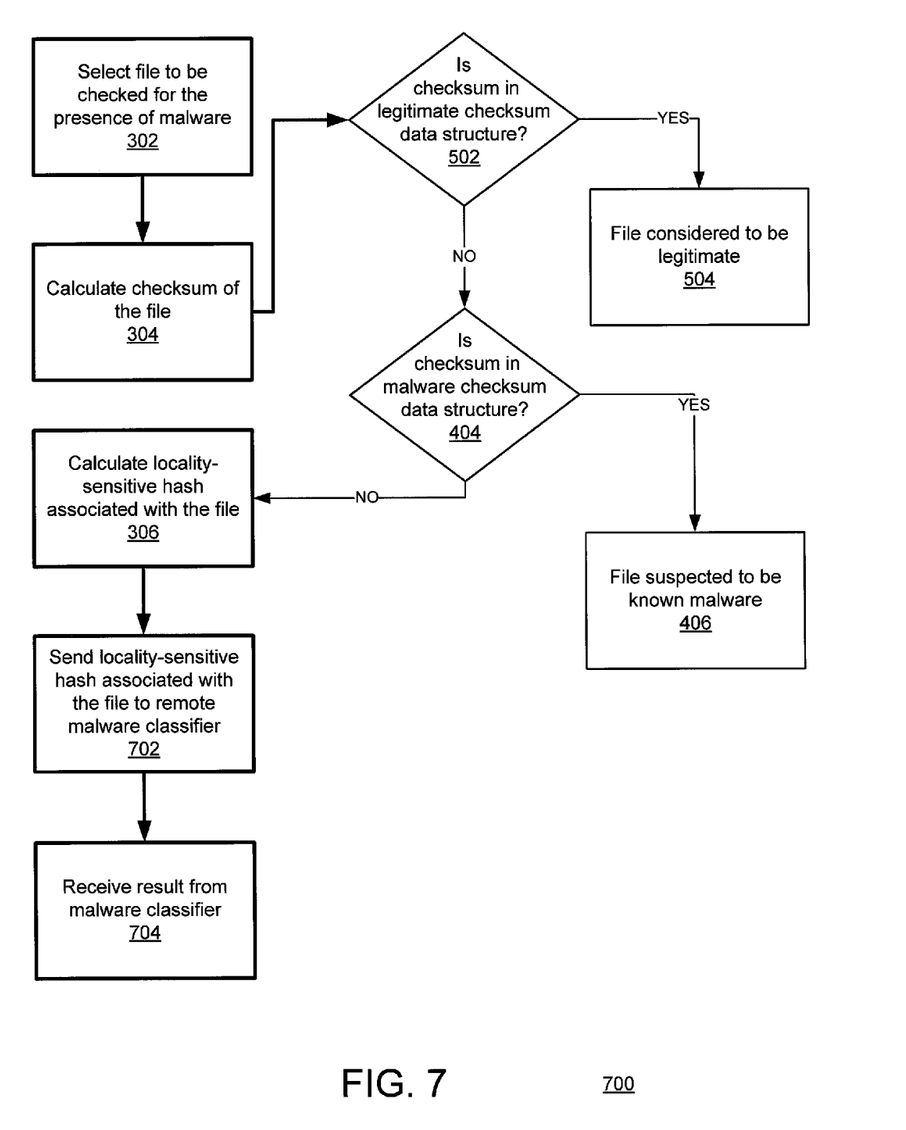
FIG. 7 is a flow chart depicting a method performed by an anti-virus engine at a host computer in accordance with the second embodiment of the invention.

FIG. 7 is a flow chart depicting a method 700 performed by an anti-virus engine 21 at a host computer 20 in accordance with the second embodiment of the invention. The method 700 of FIG. 7 is similar to the method 300 of FIG. 3. The difference is that four blocks 502, 504, 404, and 406 are inserted in FIG. 7 between blocks 304 and 306.

As seen in FIG. 7, after calculating 304 the checksum of the file, the anti-virus engine 21 makes a determination 502 as to whether the checksum is in a legitimate checksum data structure. If the checksum is found in the legitimate checksum data structure, then the AVE 21 may indicate 504 that the file is legitimate (non-malware).

On the other hand, if the checksum is not found in the legitimate checksum data structure, then the AVE 21 may make a further determination 404 as to whether the checksum is in a malware checksum data structure. If the checksum is found in the malware checksum data structure, then the AVE 21 may indicate 406 that the file is known malware.

On the other hand, if the checksum of the file is not in the malware checksum data structure, then the AVE 21 may go on to calculate 306 a locality-sensitive hash associated with the file. The AVE 21 may then send 702 the LSH associated with the file to a remote malware classifier 31 and subsequently receive 704 a result from the malware classifier 31. The result may be determined, for example, in accordance with the method 800 shown in FIG. 8.

Figure 8:
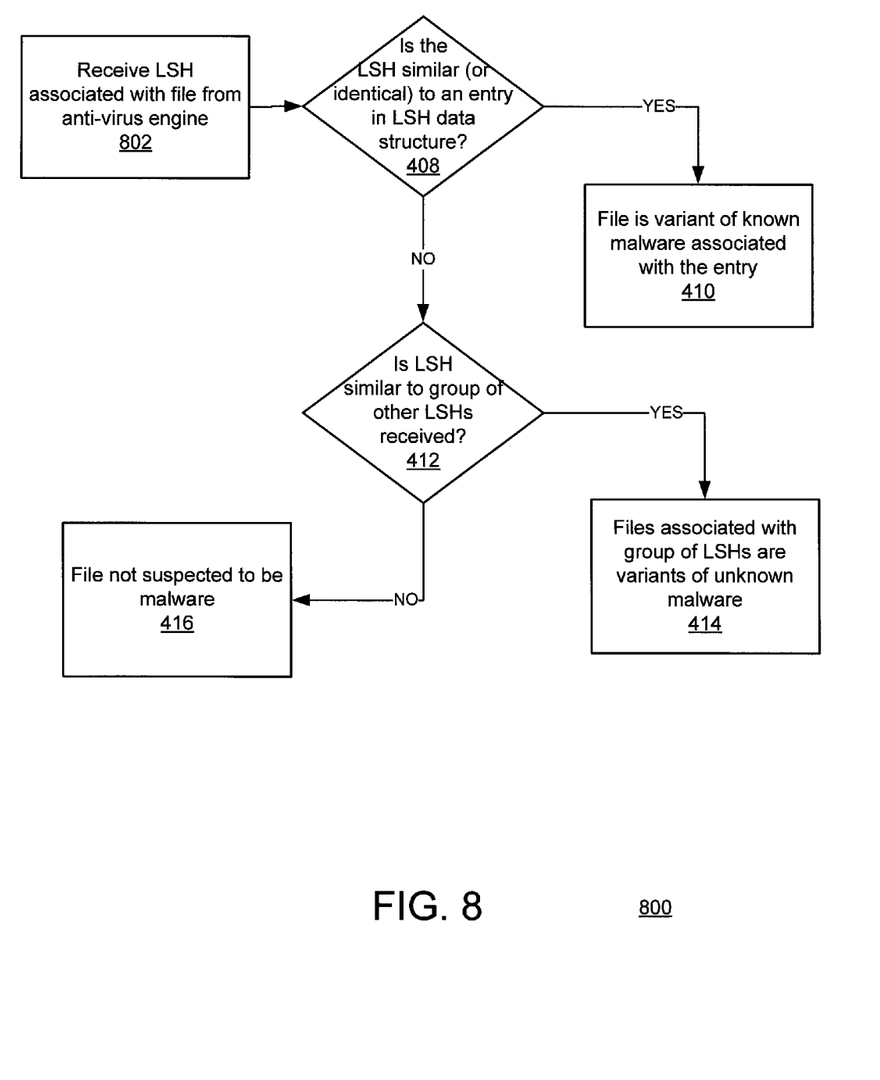
FIG. 8 is a flow chart depicting a method performed by a malware classifier at a server in accordance with the second embodiment of the invention.

FIG. 8 is a flow chart depicting a method 800 performed by a malware classifier 31 in accordance with the second embodiment of the invention. For example, the malware classifier 31 may be at a server 30 which is connected to the Internet. As seen in FIG. 8, a locality-sensitive hash (LSH)

associated with a file is received 802 by the malware classifier 31 from an anti-virus engine 21.

The malware classifier 31 may then make a determination 408 as to whether the LSH associated with the file is similar (or identical) to an entry in the LSH data structure 33. The LSH data structure 33 is a searchable data structure that includes LSH values associated with known malware files (i.e. files which were previously determined to be malware). If the LSH associated with the file is found in the LSH data structure 33, then the malware classifier 31 may indicate 410 that the file is a variant of known malware which is associated with the similar LSH entry. Such an indication may be returned to the AVE 21 which sent the LSH.

If the LSH associated with the file is not found in the LSH data structure, then the malware classifier 31 may make a further determination 412 as to whether the LSH associated with the file is similar to a group of other LSH values received. The group of other LSH values would be a group of previously submitted LSH values which are similar to each other. For example, if the LSH values are 256-bit Nilsimsa codes, then LSH values may be sufficiently similar to be considered as part of a group if the LSH values have more than N out of the 256 bits in common, where N is a settable threshold number of bits. If the LSH associated with the file is sufficiently similar to a group of other LSH values received, then the malware classifier 31 may indicate 414 that the files associated with the group of LSH values are variants of an unknown malware. Such an indication may be returned to the AVE 21 which sent the LSH value.

Finally, if the LSH associated with the file is not similar to any group of other LSH values received, then the malware classifier 31 may indicate 416 that the file associated with the LSH is not suspected to be malware. Such an indication may be returned to the AVE 21 which sent the LSH code.

Figure 9:
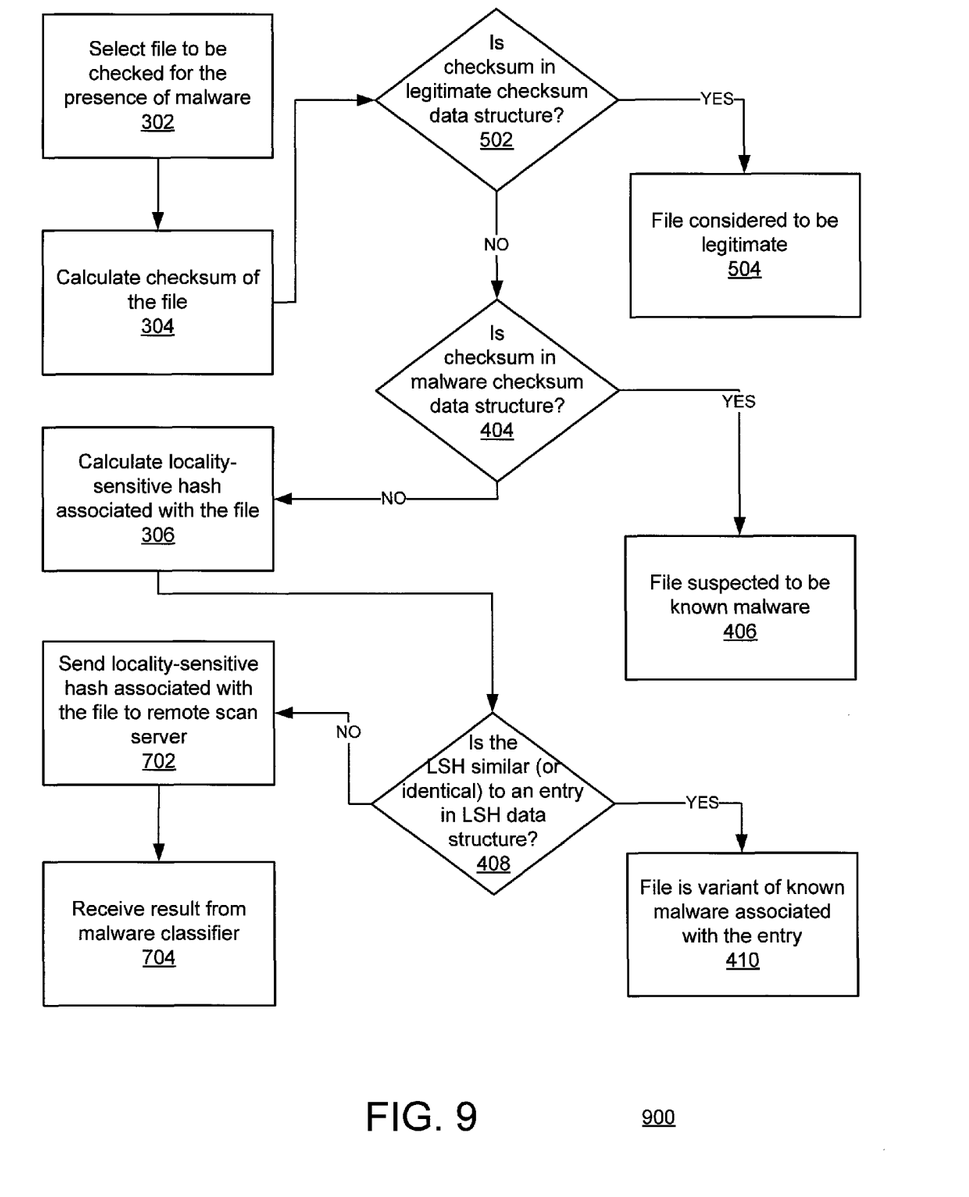
FIG. 9 is a flow chart depicting an alternate method performed by an anti-virus engine at a host computer in accordance with the second embodiment of the invention.

FIG. 9 is a flow chart depicting an alternate method 900 performed by an anti-virus engine 21 at a host computer 20 in accordance with the second embodiment of the invention. The method 900 of FIG. 9 is similar to the method 700 of FIG. 7. The difference is that two blocks 408 and 410 are inserted in FIG. 9 between blocks 306 and 702.

As seen in FIG. 9, after calculating 306 the LSH associated with the file, the anti-virus engine 21 makes a determination 408 as to whether the calculated LSH is similar (or identical) to an entry in the LSH data structure 33. If the calculated LSH is found in the LSH data structure 33, then the malware classifier 31 may indicate 410 that the file is a variant of known malware which is associated with the similar LSH entry. Such an indication may be returned to the AVE 21 which sent the LSH.

On the other hand, if the calculated LSH is not found in the LSH data structure, then the AVE 21 may send 702 the calculated LSH to a remote malware classifier 31 and subsequently receive 704 a result from the malware classifier 31. The result may be determined, for example, in accordance with the method 1000 shown in FIG. 10.

Figure 10:
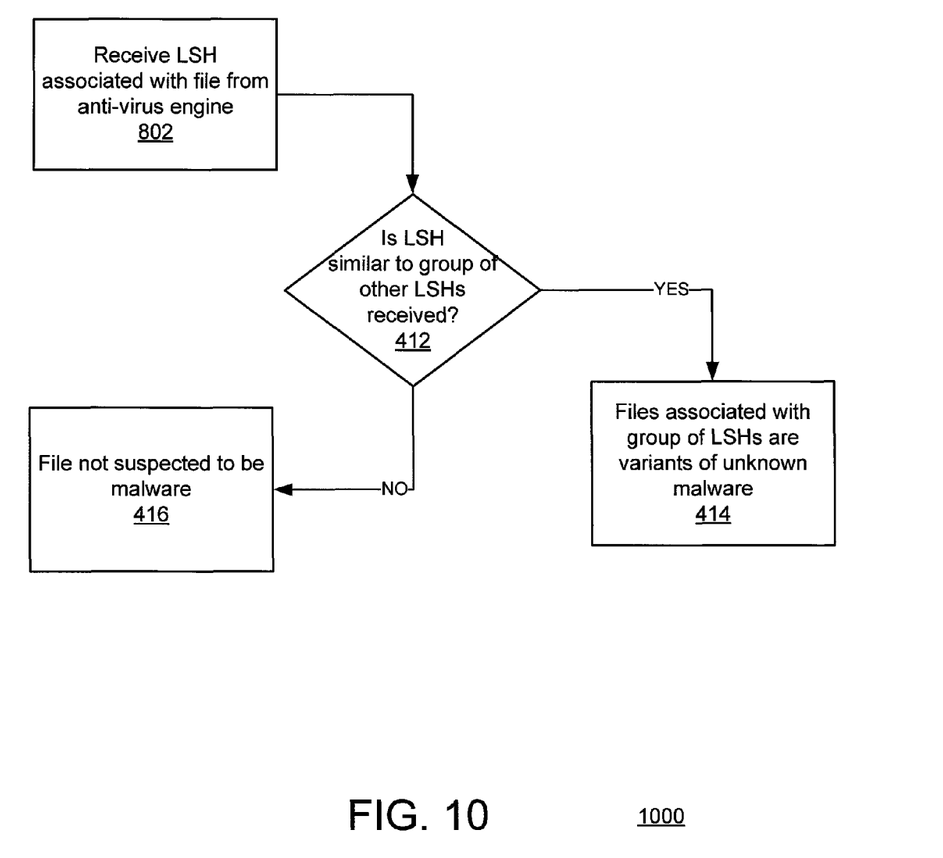
FIG. 10 is a flow chart depicting an alternate method performed by a malware classifier at a server in accordance with the second embodiment of the invention.

FIG. 10 is a flow chart depicting an alternate method 1000 performed by a malware classifier 31 in accordance with the second embodiment of the invention. As seen in FIG. 10, a locality-sensitive hash (LSH) of a file is received 802 by the malware classifier 31 from an anti-virus engine 21.

The malware classifier 31 may then make a determination 412 as to whether the received LSH value is similar to a group of other LSH values received. The group of other LSH values would be a group of previously submitted LSH values which are similar to each other. For example, if the LSH values are 256-bit Nilsimsa codes, then a LSH values may be sufficiently similar to be considered as part of a group if the LSH values have more than N out of the 256 bits in common, where N is a settable threshold number of bits. If the received LSH value is sufficiently similar to a group of other LSH values received, then the malware classifier 31 may indicate 414 that the files associated with the group of LSH values are variants of an unknown malware. Such an indication may be returned to the AVE 21 which sent the LSH.

On the other hand, if the received LSH value is not similar to any group of other LSH values received, then the malware classifier 31 may indicate 416 that the file associated with the received LSH value is not suspected to be malware. Such an indication may be returned to the AVE 21 which sent the LSH value.

Let us now consider a first scenario in which the apparatus and methods disclosed herein may be applied. It is common for new variants of existing malware families to be frequently created. This causes problems for traditional signature-based malware identification because the checksums of the new variants are not in the databases of checksums of known malware.

In accordance with an embodiment of the invention, for some malware families, we have established that the locality-sensitive hashes of the executable string associated with the malware does not significantly change between members within the malware family. For example, see Table 1 below.

TABLE 1

| MALWARE FAMILY | NFILES | NCLUST | NMATCHED |
|---|---|---|---|
| BKDR_Generic | 241 | 3 | 18 |
| BKDR_PCCLIEN.AFR | 467 | 5 | 420 |
| Cryp_Pai-6 | 23 | 0 | 0 |
| Mal_Banker | 313 | 9 | 65 |
| Mal_HPGN-1 | 219 | 6 | 82 |
| Mal_NSAnti-1 | 499 | 1 | 11 |
| PAK_Generic.001 | 235 | 3 | 10 |
| PAK_Generic.005 | 460 | 4 | 14 |
| PAK_Generic.006 | 439 | 10 | 44 |
| PE_TANK.A | 460 | 1 | 305 |
| Possible_Nucrp-6 | 495 | 0 | 0 |
| Possible_Pai-2 | 497 | 22 | 249 |
| Possible_Virus | 322 | 10 | 55 |
| TROJ_DROPPER.CPE | 500 | 1 | 500 |
| TROJ_Generic | 306 | 4 | 17 |
| TROJ_NUWAR.KY | 500 | 7 | 500 |
| TROJ_ZLOB.CHK | 500 | 0 | 0 |
| WORM_NUCRP.GEN | 437 | 1 | 6 |
| WORM_NUWAR.AR | 500 | 28 | 456 |
| WORM_NUWAR.BK | 500 | 11 | 403 |
| WORM_SDBOT.GAV | 47 | 0 | 0 |

In Table 1, the columns provide the following information. The MALWARE FAMILY column provides a name of the malware family. The NFILES column provides the number of sample files that were analyzed from the malware family. The NCLUST column provides the number of clusters that were generated using a hierarchical agglomerative clustering (HAC) algorithm applied to the LSH values. Finally, the NMATCHED column provides the number of files (out of NFILES) which has a threshold of 230 or more bits (out of 256 bits) in common with one or more of the cluster centroids. As seen, if NMATCHED is a substantial portion of NFILES (for example, for BKDR_PCCLIEN.AFR), then the locality-sensitive hashes of the executable string do not significantly change between members within the malware family.

Hence, the locality-sensitive-hashes of new members of some malware families are likely to be very similar to the locality-sensitive-hashes of previously-known members of the malware family. Therefore, the methods described herein which include steps 408 and 410 may be used advantageously to detect new (unknown) variants of known malware.

As a consequence of detecting such a variant of known malware, the malware classifier 31 may take appropriate action, which may include one or more of the following: informing the client machine that the file is likely to be a new malware variant of a known malware family; requesting a copy of the file for further analysis; and alerting users or other people (such as system administrators) of a possible infection.

Let us now consider a second scenario in which the apparatus and methods disclosed herein may be applied. New malware families are frequently being created by malware writers. In many cases, the new malware family will be constructed in such a way so that it has many variants to reduce the effectiveness of signature-based solutions.

In particular, malware writers may release a previously unknown malware for which a specific anti-malware signature is not yet available. Such malware may be called "zero day" malware. Traditional signature based malware identification is ineffective against such zero day malware.

In accordance with an embodiment of the invention, for some malware families, we have established that the locality-sensitive-hashes of the executable string associated with the malware does not significantly change. Therefore, the methods described herein which include steps 412 and 414 may be used advantageously to detect some new (unknown) malware families.

As a consequence of detecting such a new malware family, the malware classifier 31 may take appropriate action, which may include one or more of the following: informing the client machine that the file is likely to be new malware; requesting a copy of the file for further analysis; and alerting users or other people (such as system administrators) of a possible infection by new malware.

Figure 11:
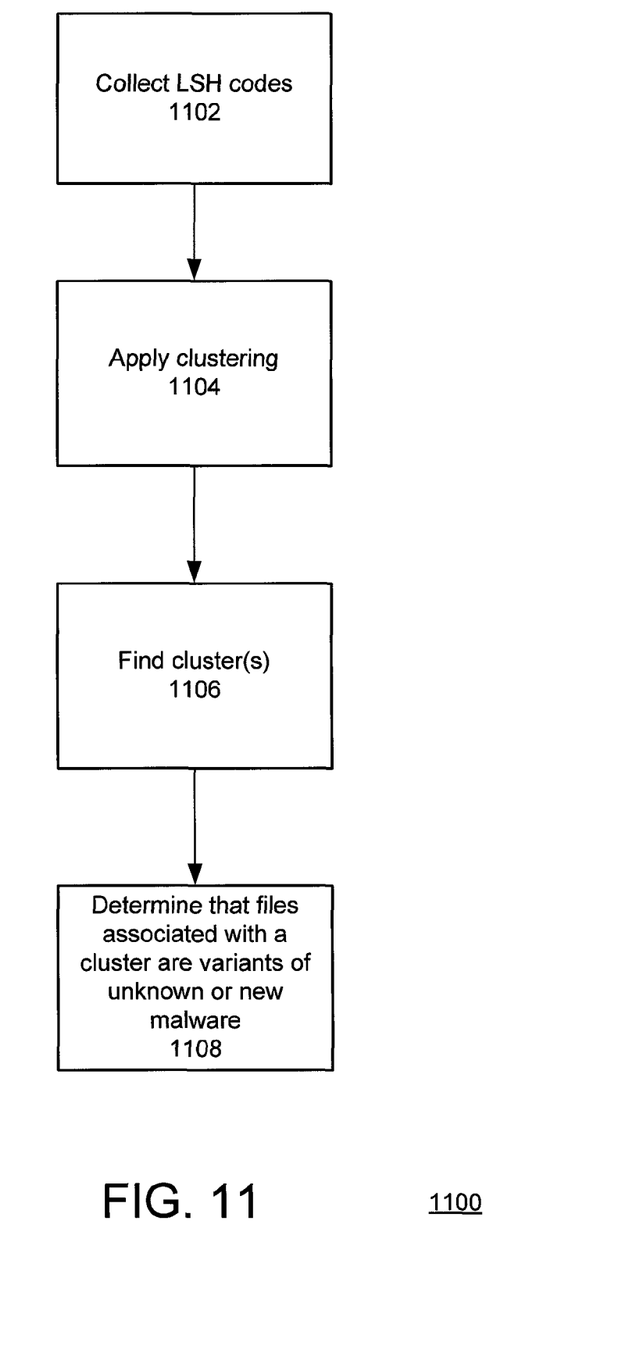
FIG. 11 is a flow chart showing a method of detecting malware within an institutional network in accordance with an embodiment of the invention.

FIG. 11 is a flow chart showing a method 1100 of detecting malware within an institutional network in accordance with an embodiment of the invention. For example, the institutional network may comprise a wide area network of an enterprise.

As shown, a server collects 1102 LSH codes associated with various files from the institutional network. The LSH codes may be collected 1102 from files in data storage within the network or from files in transmission to/from outside the network, for example. The LSH codes may be computed from the files themselves or memory images of the files.

A clustering technique may then be applied 1104 to the collected LSH codes. The clustering technique finds 1106 one or more cluster(s) where the LSH codes are similar, but yet distinct from each other. Such clusters are very suspicious and likely to correspond to new or unknown malware. Hence, it may be determined 1108 that the files associated with a cluster of LSH codes are variants of an unknown or new malware.

Improved apparatus and methods for the detection and classification of malware have been disclosed herein. While specific embodiments of the present invention have been provided, it is to be understood that these embodiments are for illustration purposes and not limiting. Many additional embodiments will be apparent to persons of ordinary skill in the art reading this disclosure.

What is claimed is:

1. An apparatus for remote classification of malware, the apparatus comprising:
 a data storage system configured to store computer-readable code and data;
 a network interface communicatively connected to a network and configured to receive and send data via the network;
 a processor for accessing the data storage system and to execute said computer-readable code;
 computer-readable code for execution by the processor so as to receive a locality-sensitive hash (LSH) value and a checksum of a file from a host computer via the network interface;
 computer-readable code for execution by the processor so as to determine whether the LSH value of the file is similar to an LSH value in an entry in an LSH data structure;
 computer-readable code for execution by the processor so as to indicate that the file is a variant of known malware of the entry if the LSH value of the file is similar to the LSH value in the entry while the checksum of the file is different from the checksum in the entry; and
 computer-readable code for execution by the processor so as to determine that the file is a variant of an unknown malware when the LSH value of the file is similar to a group of LSH values that were previously received but not determined to be malware such that the LSH values in the group are not in any entry in the LSH data structure, wherein the group of LSH values has an adjustable predetermined number of matching bits, while the checksum of the file is different from checksums of the group; and
 computer-readable code for execution by the processor so as to indicate that files of the group of LSH values are variants of an unknown malware which is not of any entry in the LSH data structure.

2. The apparatus of claim 1, wherein the LSH values comprise Nilsimsa codes, and wherein two LSH values are determined to be similar to each other if they have more bits in common than a threshold number of bits.

3. The apparatus of claim 1, wherein the LSH value of the file is computed on a memory image of the file at a predetermined event.

4. The apparatus of claim 1, wherein the LSH value is determined to be similar to the group of LSH values if all said LSH values have more bits in common than a threshold number of bits.

5. The apparatus of claim 1, further comprising:
 computer-readable code for execution by the processor so as to determine whether the checksum value matches a stored checksum value in a malware checksum data structure; and
 computer-readable code for execution by the processor so as to indicate that the file is known malware if the checksum value matches the stored checksum value.

6. The apparatus of claim 1, further comprising:
 computer-readable code for execution by the processor so as to determine whether the checksum value matches a stored checksum value in a legitimate checksum data structure; and
 computer-readable code for execution by the processor so as to indicate that the file is legitimate if the checksum value matches the stored checksum value.

7. A method performed by executing computer-readable code on an apparatus which includes a data storage system to store the computer-readable code and data, a network interface communicatively connected to a network to receive and send data via the network, and a processor to access the data storage system and to execute said computer-readable code, the method comprising:

said apparatus receiving a locality-sensitive hash (LSH) value and a checksum of a file from a host computer via the network interface;

said apparatus determining whether the LSH value of the file is similar to a LSH value in an entry in an LSH data structure;

said apparatus indicating that the file is a variant of known malware of the entry if the LSH value of the file is similar to the LSH value in the entry while the checksum of the file is different from the checksum in the entry;

said apparatus determining that the file is a variant of an unknown malware when the LSH value of the file is similar to a group of LSH values that were previously received but not determined to be malware such that the LSH values in the group are not in any entry in the LSH data structure, wherein the group of LSH values has an adjustable predetermined number of matching bits, while the checksum of the file is different from checksums of the group; and said apparatus indicating that files of the group of LSH values are variants of an unknown malware which is not of any entry in the LSH data structure.

8. The method of claim 7, wherein the LSH values comprise Nilsimsa codes, and wherein two LSH values are determined to be similar to each other if they have more bits in common than a threshold number of bits.

9. The method of claim 7, wherein the LSH value associated with the file is computed on a memory image of the file at a predetermined event.

10. The method of claim 7, wherein the LSH value associated with the file is determined to be similar to the group of LSH values if all said LSH values have more bits in common than a threshold number of bits.

11. The method of claim 7, further comprising:
said apparatus determining whether the checksum value associated with the file matches a stored checksum value in a malware checksum data structure; and
said apparatus indicating that the file is known malware if the checksum value associated with the file matches the stored checksum value.

12. The method of claim 7, further comprising:
said apparatus determining whether the checksum value associated with the file matches a stored checksum value in a legitimate checksum data structure; and
said apparatus indicating that the file is legitimate if the checksum value associated with the file matches the stored checksum value.

13. A system for determining whether a file includes malware, the system comprising:
a host computer which includes
a data storage system to store computer-readable code and data,
a network interface communicatively connected to a network and configured to receive and send data via the network,
a processor to access the data storage system and to execute said computer-readable code,
computer-readable code for execution by the processor so as to select a file to be checked for presence of malware,
computer-readable code for execution by the processor so as to calculate a locality-sensitive hash (LSH) value and a checksum of the file,
computer-readable code for execution by the processor so as to send the LSH value of the file to a remote malware classifier, and
computer-readable code for execution by the processor so as to receive a result from the remote malware classifier which indicates whether the file includes malware; and
a server computer which includes the remote malware classifier, wherein the remote malware classifier includes computer-readable code for determining whether the LSH value of the file is similar to an LSH value in an entry in an LSH data structure, computer-readable code for indicating that the file is a variant of known malware of the entry if the LSH value of the file is similar to the LSH value in the entry while the checksum of the file is different from the checksum in the entry, computer-readable code for determining that the file is a variant of an unknown malware when the LSH value associated with the file is similar to a group of LSH values that were previously received by the server computer but not determined to be malware such that the LSH values in the group are not in any entry in the LSH data structure, wherein the group of LSH values has an adjustable predetermined number of matching bits, while the checksum of the file is different from checksums of the group, and computer-readable code for indicating that the file is a variant of an unknown malware which is not of any entry in the LSH data structure.

14. The system of claim 13, wherein the LSH value comprises a Nilsimsa code.

15. The system of claim 13, wherein the host computer further comprises:
computer-readable code for execution by the processor so as to send the checksum along with the LSH value to the remote malware classifier.

16. The system of claim 13, wherein the host computer further comprises:
computer-readable code for execution by the processor so as to determine whether the checksum matches a stored checksum in a legitimate checksum data structure; and
computer-readable code for execution by the processor so as to indicate that the file is legitimate if the checksum value matches the stored checksum value.

17. The system of claim 13, wherein the host computer further comprises:
computer-readable code for execution by the processor so as to determine whether the checksum matches a stored checksum in a malware checksum data structure; and
computer-readable code for execution by the processor so as to indicate that the file is malware if the checksum value matches the stored checksum value.

* * * * *